United States Patent [19]

Carbonnel

[11] 4,086,097

[45] Apr. 25, 1978

[54] METHOD OF PREPARING INSULATING REFRACTORY PRODUCTS AND THE PRODUCT THEREOF

[75] Inventor: Henri Carbonnel, Antony, France

[73] Assignee: Groupement pour les Activites Atomiques et Avancees "GAAA" S.A., Le Plessis Robinson, France

[21] Appl. No.: 644,009

[22] Filed: Dec. 24, 1975

[30] Foreign Application Priority Data

Jan. 15, 1975 France .................................. 75 01178
Nov. 21, 1975 France .................................. 75 35690

[51] Int. Cl.² .............................................. C04B 7/32
[52] U.S. Cl. ...................................... 106/64; 106/104; 264/43; 264/235; 264/333
[58] Field of Search ..................... 264/235, 41, 42, 43, 264/44, 333; 106/104, 99, 85, 64

[56] References Cited

U.S. PATENT DOCUMENTS

| | | | |
|---|---|---|---|
| 3,079,267 | 2/1963 | Konrad et al. | 106/104 |
| 3,150,992 | 9/1964 | Crowley | 106/104 |
| 3,253,936 | 5/1966 | Weindel | 106/104 |
| 3,275,721 | 9/1966 | Leroy | 264/43 |
| 3,467,535 | 9/1969 | Myles | 106/104 |
| 3,508,940 | 4/1970 | Webb | 106/104 |
| 3,990,901 | 11/1976 | Engstrom et al. | 264/43 |

*Primary Examiner*—Donald J. Arnold
*Attorney, Agent, or Firm*—Sughrue, Rothwell, Mion, Zinn and Macpeak

[57] ABSTRACT

Refractory products having remarkable resistance to thermal shocks, comprising 60% of the total weight of ceramic fibres, dispersed in 40% of the total weight of cement, obtained by slow heating up to 800° C after the setting and the stripping. A chemical bond is set up in those conditions between the fibre and the calcium aluminate of the cement. Application to the manufacturing of parts remaining in contact with reactive molten metals.

2 Claims, No Drawings

METHOD OF PREPARING INSULATING REFRACTORY PRODUCTS AND THE PRODUCT THEREOF

The present invention concerns insulating refractory products having high porosity, as well as a method for preparing them.

It is known that the implementing of equipment for pumping, purifying, handling corrosive molten metals such as aluminium is conditioned by the existence of materials withstanding, on a long-term basis, the high temperature at which those molten metals are kept and capable of withstanding repeated thermal shocks as well as the corrosive action of those metals.

It is also know that ceramic substances capable of satisfying the above conditions have been produced.

Theory and experiment have also shown that the resistance to thermal shocks of a refractory material is proportional to the breaking stress S and that it is inversely proportional to the product of the coefficient of expansion by the Young's Modules E. Therefore, on the one hand, these materials must have high resistance to the breaking stress S and consequently they must have high cohesion of the material, but, on the other hand, those materials must have as low a Young's modulus E as possible. It was possible to satisfy thos contradictory requirements by incorporating refractory fibres in ceramic substances.

It is known that it was thus possible to manufacture refactory products having a dispersed structure with a Young's modulus in the order of 20,000 kg/squ.cm. in which the tensile strength reaches 11 kg/squ. cm, the crushing-strength is 100 kg/squ.cm. It is known that such products have a coefficient of thermal conductivity comprised between 0.2 and 0.4 Kcal/m/° C/hour.

Nevertheless, it appeared possible to lower further the coefficient of thermal conductivity of those products while maintaining, for the breaking stress S, a high value, by forming a material which is intermediate between ceramic substances and concrete, in which the dispersed ceramic fibre provides unequalled isotropic cohesion and in which a chemical bonding between the fibre and the cement is effected under heat in contact with the oxygen of the atmosphere in particularly simple conditions.

The object of the invention is therefore an insulating isotropic refractory product having high porosity with a coefficient of thermal conductivity in the order of 0.1 Kcal/m/° C/hour, a Young's modulus in the order of 20,000 kg/squ.cm, a tensile strength of 12 kg/squ.cm and remarkable resistance to thermal shocks, constituted by refractory fibres, containing a percentage of silica less than 15%, dispersed in a proportion at least equal to 60% of the total weight in calcium aluminate, characterized in that the said refractory fibres are closely integral with the cement in which they are dispersed.

It is known that if a high proportion of ceramic fibres can be dispersed isotropically in a cement, a solid having a very satisfactory crushing strength can be obtained after the setting in a block without further precautions, but that it is not possible to machine the latter.

If that concrete is dried progressively and brought slowly to a temperature of 300° C after a prolonged stage at 100° C, the cohesion of the product increases very noticeably; therefore it is possible to machine the block, its crushing-strength remains very satisfactory; but its tensile strength is still very slight and its resistance to thermal shocks is not yet satisfactory. If, on the other hand, that block is now brought very progressively to the temperature of 800° C, it undergoes a chemical transformation bonding the refractory fibre to the calcium aluminate of the cement in contact with the oxygen in the atmosphere. That chemical transformation is, moreover, made easy by the complete removal of water in all its forms by the prolonged stages at 100° C and at 300° C. The block, which originally had a light grey colour, changed colour and became pink. The tensile strength, moreover, is then in the order of 12 kg/squ.cm and the resistance to thermal shocks is remarkable.

The close bonding which has been formed probably between the silica of the dispersed fibre and the mass of the product gives the refractory product as a whole the remarkable properties inherent to the fibres. The product obtained has appreciable cohesion and resonates when it undergoes a shock as a mass of metal would do. The fibre adheres closely to the cement in which it is dispersed, causing that transfer of the properties from the fibres to the refractory mass as a whole.

An example of the preparation of a product according to the invention is described hereinbelow:

The following products are put in a mixer-crusher machine of a known type:
- 1000 g of Secar 250 Lafarge cement (calcium aluminate);
- 1500 g of alumina fibres containing a proportion of silica less than 15%.

After mixing for 15 minutes, during which the alumina fibres were broken, reduced in the mixer to an average length in the order of a millimeter, water is added to the product. The latter is put in a mould and vibrated for a few instants in order to obtain a close contact with the walls of the mold.

When the setting is started up, that product is stripped and put in an oven. The temperature is raised progressively at a rate of 10° per hour to reach 100° C and after a stage of several hours, 10 hours, for example, the temperature is raised with the same slope up to 300° C. After a second long stage, the product is placed in a furnace and maintained in contact with the air of the atmosphere and the temperature is raised with the same slope up to 800° C.

It should be observed that the product thus obtained depends within narrow limits on the method used for manufacturing it. If the stoving of the product coming from the mould after having set were effected with a rapid rise in temperature, the water of the product would certainly be removed, but to the detriment of the homogeneity of the product. Likewise, if the baking is effected at a higher temperature, the chemical reaction between the refractory fibre and the cement in which it is dispersed would be more rapid and incomplete, the bonding between the fibres and the cement would be defective, and the quality of the product would be altered. Likewise, if the stoving is effected with a rapid slope and the baking is effected at a higher temperature, the product obtained will be heterogeneous and the bonding between the fibres and the cement will be imperfect. Lastly, if the rise in temperature is effected according to the above method but the maximum temperature reached is higher, the heating of a stable product above 800° will have been effected without any advantage. It can be concluded from the above that the above product and the method for obtaining it are closely interdependent. The claim for the method completes the definition of the product such as it is set forth in the claim concerning the product.

I claim:

1. Method for preparing an insulating isotropic refractory product resistant to thermal shock and resistant to the corrosive action of molten metal, having high porosity, having a high coefficient of thermal conductivity of the order of 0.1 K cal/m/° C/hour, a Young's modulus of the order of 20,000 kg/squ. cm, a high tensile strength of the order of 12 kg/squ. cm, constituted by refractory fibers dispersed in a cement, characterized in that said product is produced by the following sequential process operations:

dry dispersing a mixture consiting of calcium aluminate cement mix and refractory fibers composed of less than 15% silica content, the percentage of fibers in relation to the total weight of the dry mixture being at least equal to 60%, forming concrete by adding water to the dry mixture and placing in a mold, stripping the concrete from the mold after the beginning of the setting, drying the concrete outside the mold at a temperature increase of 10° per hour up to 300° C with a prolonged heat stage of several hours at 100° and 300° C, increasing the temperature of drying with the same 10° C per hour rate from 300° to 800° C, and baking the concrete at 800° C in air to form a chemical bonding between the refractory fibers and the calcium aluminate of the cement.

2. Insulating isotropic refractory product having high porosity according to claim 1.

* * * * *